US012186659B2

(12) United States Patent
Huang et al.

(10) Patent No.: US 12,186,659 B2
(45) Date of Patent: Jan. 7, 2025

(54) METHOD AND APPARATUS FOR PREVIEWING IN-GAME ACTION IN OUT-OF-GAME ENVIRONMENT, TERMINAL, AND STORAGE MEDIUM

(71) Applicant: Tencent Technology (Shenzhen) Company Limited, Shenzhen (CN)

(72) Inventors: Yongliang Huang, Shenzhen (CN); Yiwei Song, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 683 days.

(21) Appl. No.: 17/497,784

(22) Filed: Oct. 8, 2021

(65) Prior Publication Data
US 2022/0023758 A1 Jan. 27, 2022

Related U.S. Application Data

(63) Continuation of application No. PCT/CN2020/116508, filed on Sep. 21, 2020.

(30) Foreign Application Priority Data

Oct. 17, 2019 (CN) .......................... 201910989757.0

(51) Int. Cl.
*A63F 13/77* (2014.01)
*A63F 13/533* (2014.01)
(Continued)

(52) U.S. Cl.
CPC ............ *A63F 13/533* (2014.09); *A63F 13/77* (2014.09); *G06F 40/205* (2020.01);
(Continued)

(58) Field of Classification Search
CPC ................................................ A63F 2300/308
See application file for complete search history.

(56) References Cited

U.S. PATENT DOCUMENTS 6,533,663 B1 * 3/2003 Iwao ........................ A63F 13/45
463/31
2011/0086702 A1 * 4/2011 Borst ...................... A63F 13/44
463/30
(Continued)

FOREIGN PATENT DOCUMENTS

CN      103326732 A    9/2013
CN      105718152 A    6/2016
(Continued)

OTHER PUBLICATIONS

Tencent Technology, Indonesian Office Action, ID Patent Application No. P00202203086, Jan. 31, 2024, 3 pgs.
(Continued)

*Primary Examiner* — Corbett B Coburn
(74) *Attorney, Agent, or Firm* — Morgan, Lewis & Bockius LLP

(57) ABSTRACT

This application provides a method for previewing an in-game action in an out-of-game environment performed by a terminal. The method includes: displaying an out-of-game environment interface; obtaining, when a trigger operation for a target preview control in the out-of-game environment interface is received, a target configuration file corresponding to the target preview control for controlling a target character model to perform a corresponding in-game action in a battle of an online game application; generating out-of-game model preview information according to the target configuration file; and controlling, according to the out-of-game model preview information, the target character model to perform the in-game action in the out-of-game environment interface. An in-game action of a character model is
(Continued)

previewed in an out-of-game environment by reusing in-game configuration files, this application enriches types of in-game actions that can be previewed.

17 Claims, 9 Drawing Sheets

(51) Int. Cl.
  *G06F 40/205* (2020.01)
  *G06F 40/242* (2020.01)
(52) U.S. Cl.
  CPC ...... *G06F 40/242* (2020.01); *A63F 2300/308* (2013.01); *A63F 2300/405* (2013.01); *A63F 2300/572* (2013.01); *A63F 2300/69* (2013.01)

(56) References Cited

U.S. PATENT DOCUMENTS

| | | | | |
|---|---|---|---|---|
| 2012/0329540 A1* | 12/2012 | Wayans | ............... | A63F 9/0612 |
| | | | | 463/9 |
| 2014/0245213 A1* | 8/2014 | Gardenfors | ........... | H04L 51/066 |
| | | | | 715/778 |
| 2014/0256420 A1* | 9/2014 | Justice | .................... | G06F 12/00 |
| | | | | 463/29 |
| 2015/0135109 A1* | 5/2015 | Zambetti | ............ | G06F 3/03547 |
| | | | | 715/767 |
| 2017/0354892 A1* | 12/2017 | Benedetto | ............. | A63F 13/216 |
| 2018/0161682 A1 | 6/2018 | Myhill | | |
| 2019/0118086 A1* | 4/2019 | Gentile | .................. | A63F 13/25 |
| 2019/0205366 A1 | 7/2019 | Matsumoto et al. | | |

FOREIGN PATENT DOCUMENTS

| | | |
|---|---|---|
| CN | 106502670 A | 3/2017 |
| CN | 106730839 A | 5/2017 |
| CN | 108399069 A | 8/2018 |
| CN | 109126130 A | 1/2019 |
| CN | 109513211 A | 3/2019 |
| CN | 109771957 A | 5/2019 |
| CN | 110732136 A | 1/2020 |
| EP | 3995189 A1 | 5/2022 |
| EP | 3995189 B1 | 8/2023 |

OTHER PUBLICATIONS

Tencent Technology, Korean Office Action, KR 2021-7034584, Oct. 13, 2023, 12 pgs.

Magatron.Tistory.com, "Creating a Unity Game—It Produces with the RPG Game Construction, 24 XML Manager to Produce with the Unity Game, and the Internet Teeth Spool of Thread Posted Writing", Jul. 23, 2019, 21 pgs., Retrieved from the internet: https://magatron.tistory.com/73.

Yapimar, "Brawl Stars—Finally Weakened Pam!! Update Information! My Time? Sherry is Strengthened and the World's Number One Sherry User is Excited!! ", YouTube, Apr. 16, 2019, 4 pgs., Retrieved from the Internet: https://www.youtube.com/watch?v=MwxpbvexWA.

Sukikake, "How to Change Brawl Stars "Name Color" is Super Easy! Items that Can Be Changed Colorfully", Apr. 16, 2019, 24 pgs., Retrieved from the Internet:, https://222sunsun.com/brawlstarsname-color-change/.

Brawl Stars, "Latest Update!", Apr. 18, 2019, 10 pgs., Retrieved from the Internet: https://blog.brawlstars.com/en/blog/game-updates/jpupdate-4-15.html.

Tencent Technology, JP Office Action, Japanese Patent Application No. 2021-564928, Dec. 6, 2022, 9 pgs.

Tencent Technology, WO, PCT/CN2020/116508, Dec. 21, 2020, 5 pgs.

Tencent Technology, IPRP, PCT/CN2020/116508, Apr. 19, 2022, 6 pgs.

Extended European Search Report, EP20876113.0, Jul. 15, 2022, 11 pgs.

Madsen Hayes, "Zelda Breath of the Wild: How to Take Selfies", Mar. 9, 2017, XP055939266, 2 pgs., Retrieved from the Internet: https://web.archive.org/web/20170318154435/https://twinfinite.net/2017/03/zelda-breath-of-the-wild-how-to-take-selfies/.

Unity Technologies, "Animation System Overview", Unity User Manual, Dec. 4, 2018, XP055939261, 3 pgs., Retrieved from the Internet: https://web.archive.org/web/20181204043458/https://docs.unity3d.com/Manual/AnimationOverview.html.

Bilibili.com, "Honor of Kings: Cheng Bingjin Exclusive Defeat Special Effects/Return to the City Special Effect Preview", Bilibili.com, Sep. 4, 2018, 2 pgs., Retrieved from the Internet: https://www.bilibili.com/video/BV1Bh411S7Ma/?spm_id_from=autoNext.

Tencent Technology, ISR, PCT/CN2020/116508, Dec. 21, 2020, 2 pgs.

Tencent Technology, Vietnamese Office Action, VN Patent Application No. 1202201329, Jun. 25, 2024, 4 pgs.

Xiaoxi SS, "The US Version of Warcraft Hero List Has Been Revised and Upgraded! The Role Can Be Previewed in 3D Model", TGBUS | Wow, Jan. 14, 2010, 3 pgs., Retrieved from the Internet: http://wow.tgbus.com/news/oseas/201001/20100114133022.shtml.

Tencent Technology, Singapore Office Action, SG Patent Application No. 11202111725W, May 10, 2023, 7 pgs.

\* cited by examiner

METHOD AND APPARATUS FOR PREVIEWING IN-GAME ACTION IN OUT-OF-GAME ENVIRONMENT, TERMINAL, AND STORAGE MEDIUM

CROSS-REFERENCE TO RELATED APPLICATIONS

This application is a continuation application of PCT Patent Application No. PCT/CN2020/116508, entitled "METHOD AND DEVICE FOR PREVIEWING IN-GAME BEHAVIORS UNDER OUT-OF-GAME ENVIRONMENT, TERMINAL AND STORAGE MEDIUM" filed on Sep. 21, 2020, which claims priority to Chinese Patent Application No. 201910989757.0, filed with the State Intellectual Property Office of the People's Republic of China on Oct. 17, 2019, and entitled "METHOD AND APPARATUS FOR PREVIEWING IN-GAME ACTION IN OUT-OF-GAME ENVIRONMENT, TERMINAL, AND STORAGE MEDIUM", all of which are incorporated herein by reference in their entirety.

FIELD OF THE TECHNOLOGY

Embodiments of this application relate to the field of computer technologies, and in particular, to a method and an apparatus for previewing an in-game action in an out-of-game environment, a terminal, and a storage medium.

BACKGROUND OF THE DISCLOSURE

In a multiplayer online battle arena (MOBA) game, "out-of-game" refers to a game environment out of a live battle in the MOBA game, where a player may learn game knowledge, obtain various gains such as a hero skin, prepare for a battle, communicate and make friends with other players, and the like out of a game; and "in-game" refers to a mission world in which a live battle game is located, where the player performs hero battle, casts abilities, and fights for a game victory in real time.

In the related art, to enable the player to view in-game actions in an in-game environment of a character in an out-of-game environment, a developer may record videos including the in-game actions in a game in advance and provide corresponding play interfaces out of the game. The player may trigger to play a corresponding video through the play interface, so as to implement an effect of previewing an in-game action out of a game.

When in-game actions are previewed in the foregoing manner, a lot of storage space needs to be occupied to store videos including the in-game actions, and a relatively large quantity of storage space is occupied by a game as a result.

SUMMARY

Embodiments of this application provide a method and an apparatus for previewing an in-game action in an out-of-game environment, a terminal, and a storage medium, to resolve a problem in the related art that a lot of storage space needs to be occupied to store videos including the in-game actions, and a relatively large quantity of storage space is occupied by a game as a result. The technical solutions are as follows.

According to an aspect, an embodiment of this application provides a method for previewing an in-game action in an out-of-game environment of an online game application, including:

displaying an out-of-game environment interface, the out-of-game environment interface being an environment interface out of a battle of the online game application, and a target character model and a target preview control being displayed in the out-of-game environment interface;

obtaining, when a trigger operation for the target preview control in the out-of-game environment interface is received, a target configuration file corresponding to the target preview control, the target configuration file being used for controlling the target character model to perform a corresponding in-game action in the battle of the online game application;

generating out-of-game model preview information according to the target configuration file; and controlling, according to the out-of-game model preview information, the target character model to perform the in-game action in the out-of-game environment interface.

According to another aspect, an embodiment of this application provides a computer device, including a processor and a memory, the memory storing at least one instruction, and the at least one instruction being executed by the processor to implement the method for previewing an in-game action in an out-of-game environment of an online game application according to the foregoing aspect.

According to another aspect, a non-transitory computer-readable storage medium is provided, storing at least one instruction, the at least one instruction being executed by a processor of a computer device to implement the method for previewing an in-game action in an out-of-game environment of an online game application according to the foregoing aspect.

According to the method for previewing an in-game action in an out-of-game environment provided in the embodiments of this application, a target character model is displayed in an out-of-game environment interface, and when a trigger operation for a target preview control corresponding to the target character model is received, a target configuration file corresponding to the target preview control is obtained, so that out-of-game model preview information is generated according to the target configuration file, and the target character model is further controlled, according to the out-of-game model preview information, to perform an in-game action in the out-of-game environment interface. An in-game action of a character model is previewed in an out-of-game environment by reusing in-game configuration files, so that types of in-game actions that can be previewed are enriched. In addition, there is no need to store videos corresponding to the in-game actions, thereby preventing in-game action videos from occupying storage space of a terminal.

DESCRIPTION OF EMBODIMENTS

Figure 1:
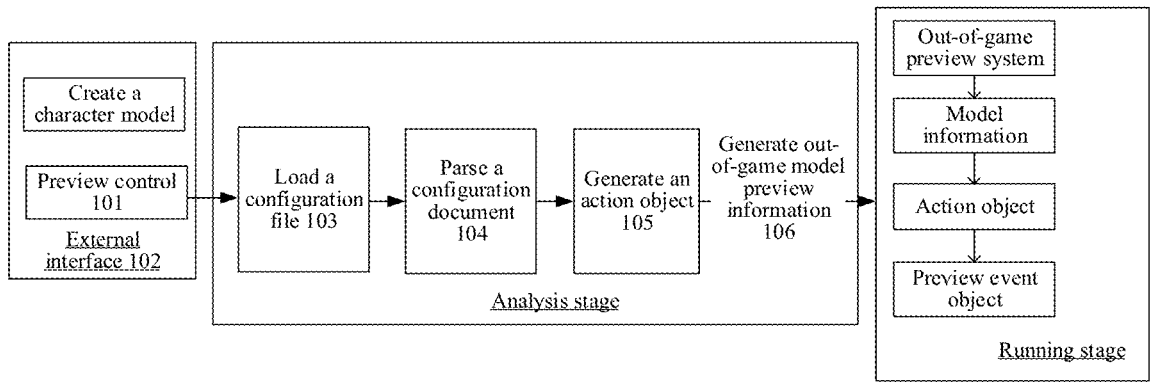
FIG. 1 is a schematic diagram of an implementation of a method for previewing an in-game action in an out-of-game environment according to an exemplary embodiment of this application.

To make the objectives, technical solutions, and advantages of this application clearer, the following further describes implementations of this application in detail with reference to the accompanying drawings.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

For convenience of understanding, some terms in the embodiments of this application are simply described in the following.

Out-of-game: an environment out of a round of battle of an online game application, a user may learn game knowledge, obtain a hero skin, prepare for a battle, and communicate and make friends with other users out of the game, and out-of-game is support and assistance for a game.

In-game: a mission world in which a round of battle is located, the user may perform hero battle, cast abilities, and fight for a game victory in the world, and in-game is core experience of a game.

Configuration file: the configuration file in the embodiments of this application refers to a file used for controlling a character model to perform a corresponding in-game action in a battle of an online game application. The in-game action may be a battle effect of a character model, such as casting an ability, a personalized action, a kill effect, a death effect, a town portal effect, a resurrection effect, and the like.

Dictionary: a dictionary in program design is similar to a real dictionary and is a set formed by a certain quantity of key-value pairs, where the key-value pairs are not arranged in a specific sequence, and a value may be found through a key. The dictionary provided in the embodiments of this application is divided into a static dictionary and a dynamic dictionary. The static dictionary is a set of a correspondence between an event parameter category and an event parameter name, the dynamic dictionary is a set of a correspondence between an event parameter category and an event parameter value, and an exemplary structure of the static dictionary and the dynamic dictionary is shown in Table 1.

TABLE 1

| Dictionary type | Key | Value |
| --- | --- | --- |
| Static dictionary | Spawn Object Duration. Event Param.Target ID//Spawn Game Object. Event Parameter. Target Identifier | "Target Id"// Target Identifier |
| Dynamic dictionary | Spawn Object Duration. Event Param.Target ID | 1 |

Out-of-game preview system: with the assistance of the out-of-game preview system, any in-game action of any character model may be previewed without entering a battle mode.

In the related art, an in-game action may be previewed in an out-of-game environment by playing a video including the in-game action in an out-of-game environment interface. For example, an implementation of previewing an in-game action that one character model dances in an out-of-game environment is: recording a video including dancing of the character model in a battle of an online game application in advance, and providing a corresponding play interface out of the game. When a trigger operation for a display control of the dancing action is received, a terminal invokes the play interface to play the video, to enable a user to preview the in-game action that one character model dances in the out-of-game environment.

Apparently, by using the method provided in the related art, due to the diversity of character models and personalized actions, to display in-game actions of character models completely, relatively more video invocation interfaces need to be provided, and a large quantity of in-game action videos are stored. As a result, a game occupies relatively large storage space.

To resolve the problem existing in the related art, in the method provided in the embodiments of this application, the original method for previewing an in-game action in an out-of-game environment is improved, and an implementation process of the improved method is shown in FIG. 1. In this method, in an out-of-game preview system, an out-of-game character model of a character model is first created. When the user taps a preview control 101, a terminal receives a trigger operation on the preview control 101 and invokes an external interface 102. The external interface 102 may invoke a configuration file 103 corresponding to the preview control 101, and the configuration file 103 is an in-game configuration file. In an analysis stage, the terminal converts the configuration file 103 into a configuration document 104, parses the configuration document 104 to generate an action object 105 instructing the character model to perform an in-game action, further generates out-of-game model preview information 106, and inputs the out-of-game model preview information 106 into the out-of-game preview system. In a running stage, the terminal updates the out-of-game preview system, model information, the action object, and a preview event object sequentially according to the out-of-game model preview information 106, so as to control, according to an update result, the character model to perform a corresponding in-game action in an out-of-game environment interface. An in-game action of a character model is previewed in an out-of-game environment by reusing in-game configuration files, so that types of in-game actions that can be previewed are enriched. In addition, there is no need to store videos corresponding to the in-game actions, thereby preventing in-game action videos from occupying storage space of a terminal.

The methods for previewing an in-game action in an out-of-game environment shown in the embodiments of this application are all applicable to a terminal on which a game application program is installed. The game application program may be a card game, a MOBA game, a role play game, a strategy game, a shooting game, or the like, and the game application program to which the embodiments of this application are applicable needs to have an in-game environment and an out-of-game environment.

Figure 2:
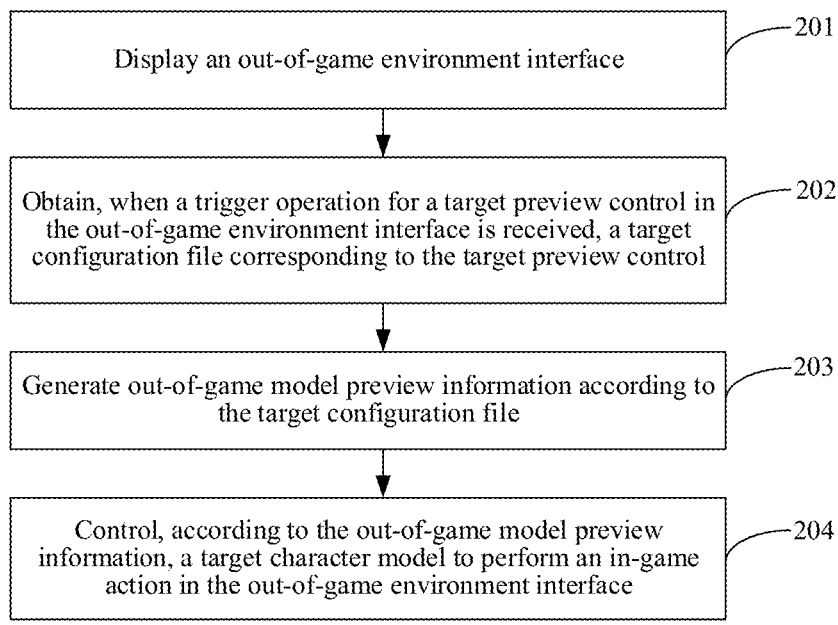
FIG. 2 is a flowchart of a method for previewing an in-game action in an out-of-game environment according to an exemplary embodiment of this application.

FIG. 2 is a flowchart of a method for previewing an in-game action in an out-of-game environment according to an exemplary embodiment of this application. A description is made by using an example in which the method is applicable to a terminal on which a game application program is installed, and the method includes:

Step 201: Display an out-of-game environment interface.

The out-of-game environment interface is an environment interface out of a game. In the out-of-game environment interface of the game, the user may preview any character model, and previewed objects may include skins, personalized actions, in-game actions (presentations), and the like of the character model. The personalized actions may be iconic actions such as angry, clap, overjoyed, sad, and the like. The in-game actions may be a kill special effect, a town portal special effect, and the like, and each special effect may match different presentation forms. In some embodiments, the personalized actions and the in-game actions may all have different presentation forms according to different character models.

In a possible implementation, after the out-of-game environment interface is opened, the user may tap and select a target character model that needs to be previewed. When a trigger operation for the target character model is received, the terminal may display the target character model in the out-of-game environment interface, and the target character model in this case may be an original character model without any personalized action or in-game effect.

Figure 3:
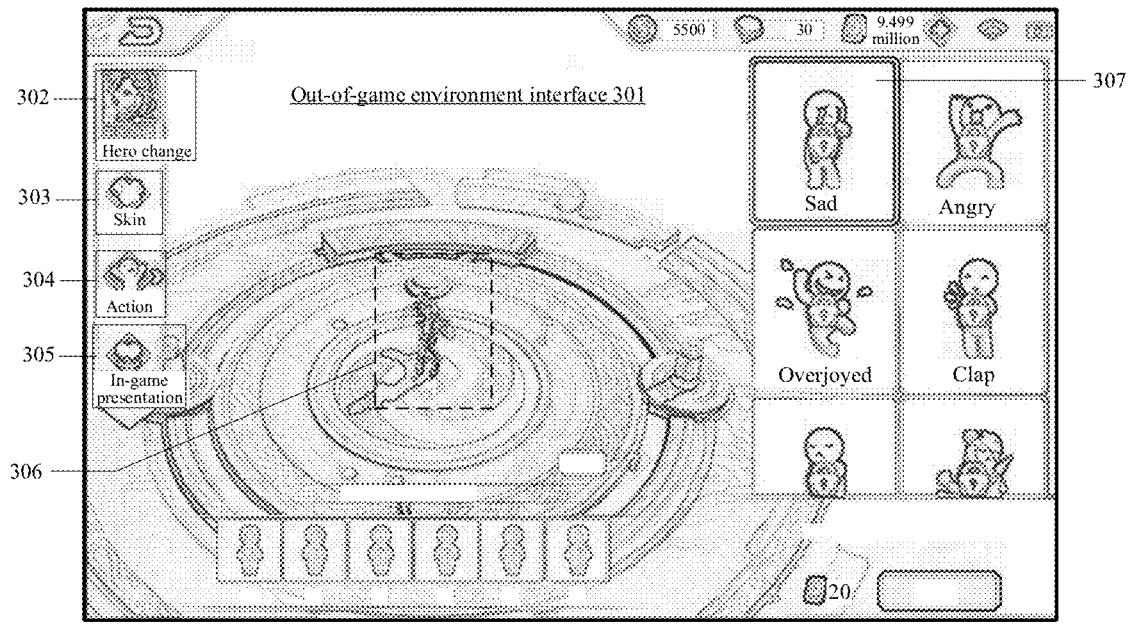
FIG. 3 is a schematic diagram of an out-of-game environment interface according to an exemplary embodiment of this application.

For example, as shown in FIG. 3, in an out-of-game environment interface 301, a hero change control 302 (which may be configured to select a character model that needs to be previewed), a skin control 303 (which may be configured to select a skin of any character model), an action control 304 (which may be configured to select a personalized action of any character model), and an in-game presentation control 305 (which may be configured to select an in-game presentation of any character model) are displayed. When the user selects one character model, after the trigger operation for the target character model is received, the terminal displays a target character model 306 on an upper layer of the out-of-game environment interface 301. After the user taps and selects the action control 304, the terminal receives a trigger operation for the action control 304 and displays a plurality of personalized action controls 307 on the upper layer of the out-of-game environment interface 301.

Step 202: Obtain, when a trigger operation for a target preview control in the out-of-game environment interface is received, a target configuration file corresponding to the target preview control.

The out-of-game environment interface may include a plurality of preview controls, different preview controls correspond to different in-game actions, and the user may preview an in-game action by tapping and selecting any preview control. For example, the user may tap and select a "Good luck with your game" preview control in town portal special effects, to preview that the target character model performs the town portal special effect of "Good luck with your game" in the out-of-game environment.

The target configuration file is used for controlling the target character model to perform a corresponding in-game action in a battle of an online game application, and the target configuration file is an in-game configuration file. The in-game configuration file may control the target character model to perform a corresponding in-game action in the game, so that the in-game action of the target character model may be also previewed in the out-of-game environment by invoking the same configuration file, provided that a corresponding invocation interface is provided.

Figure 4:
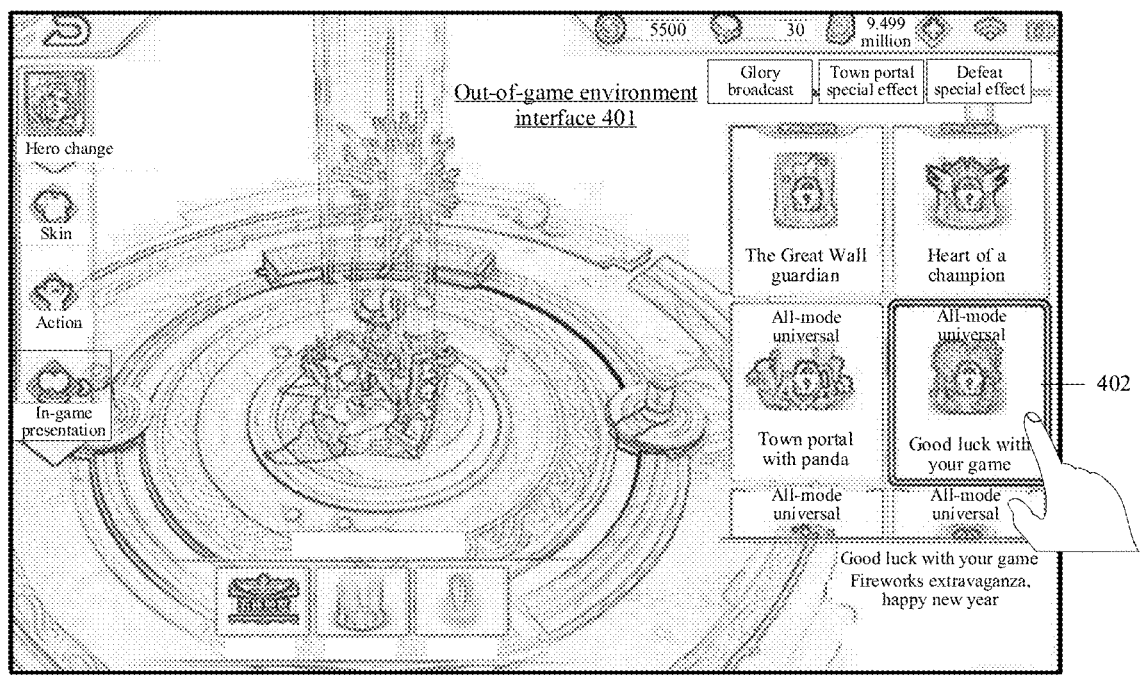
FIG. 4 is a schematic diagram of an out-of-game environment interface according to another exemplary embodiment of this application.

For example, as shown in FIG. 4, the user taps and selects the target preview control 402 "Good luck with your game" in the town portal special effects of the target character model. When a trigger operation for the target preview control 402 is received, the terminal obtains a target configuration file corresponding to the target preview control 402 through an interface, namely, obtains a configuration file that may control the target character model to perform the town portal special effect "Good luck with your game".

Step 203: Generate out-of-game model preview information according to the target configuration file.

The in-game environment and the out-of-game environment are different, so that the target configuration file cannot be directly performed in the out-of-game environment. The terminal needs to perform related processing on the target configuration file to generate out-of-game model preview information that may run in the out-of-game environment (out-of-game preview system), so as to control the target character model to perform the in-game action in the out-of-game environment interface.

Each piece of out-of-game model preview information corresponds to all preview information of one character model, and when the previewed in-game action includes interaction between a plurality of character models, out-of-game model preview information respectively corresponding different character models needs to be generated according to the target configuration file. For example, a kill special effect may include a killer character model (a master model) and a victim character model (a slave model), so that out-of-game model preview information respectively corresponding to the two models needs to be generated.

Step 204: Control, according to the out-of-game model preview information, the target character model to perform an in-game action in the out-of-game environment interface.

In a possible implementation, if only one target character model is required to complete the in-game action, the terminal controls, according to the out-of-game model preview information, the target character model to perform the in-game action in the out-of-game environment interface.

In some embodiments, if interaction between two target character models is required to implement the in-game action, the terminal obtains out-of-game model preview information respectively corresponding to the two character models, and respectively controls, according to the out-of-game model preview information, the two target character models to perform respective in-game actions in the out-of-game environment interface.

Figure 5:
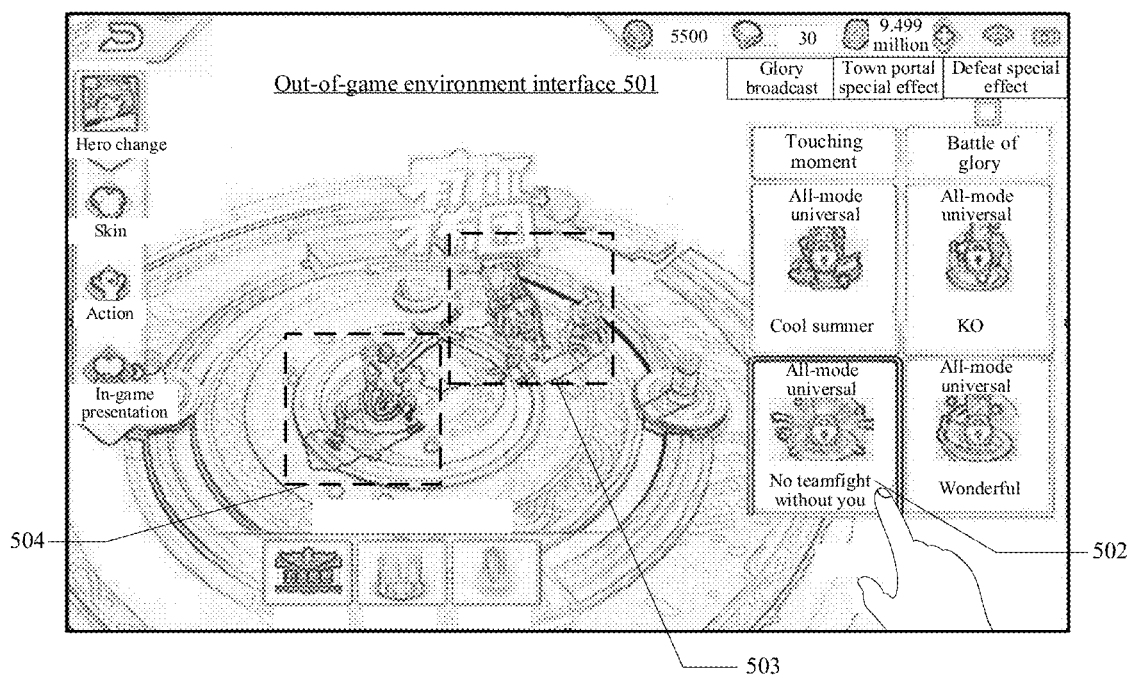
FIG. 5 is a schematic diagram of an out-of-game environment interface according to another exemplary embodiment of this application.

For example, as shown in FIG. 5, in an out-of-game environment interface 501, after the user taps and selects a target preview control 502, the terminal receives a trigger operation for the target preview control 502 and obtains a target configuration file internally. Because an in-game action corresponding to the target preview control 502 needs to be completed through interaction between a master character model (a killer) 503 and a slave character model (a victim) 504, out-of-game model preview information respectively corresponding to the two character models is generated according to the target configuration file, and the master character model 503 and the slave character model 504 are respectively controlled, according to the out-of-game model preview information, to perform the in-game action in the out-of-game environment interface 501.

Based on the above, in the embodiments of this application, a target character model is displayed in an out-of-game environment interface, and when a trigger operation for a target preview control corresponding to the target character model is received, a target configuration file corresponding to the target preview control is obtained, so that out-of-game model preview information is generated according to the target configuration file, and the target character model is further controlled, according to the out-of-game model preview information, to perform an in-game action in the out-of-game environment interface. An in-game action of a character model is previewed in an out-of-game environment by reusing in-game configuration files, so that types of in-game actions that can be previewed are enriched. In addition, there is no need to store videos corresponding to the in-game actions, thereby preventing in-game action videos from occupying storage space of a terminal.

In a possible application scenario, the method for previewing an in-game action in an out-of-game environment provided in the embodiments of this application involves an interaction process between a user interface (UI) system, an out-of-game preview system, and an in-game system in a terminal game. The UI system is configured to display an out-of-game environment interface or an in-game environment interface. The Out-of-game preview system is configured to generate out-of-game model preview information. The in-game system is configured to maintain a mission world of a battle game, and the in-game system stores configuration files that are provided for character models to perform in-game actions and are used for controlling the character models to perform the in-game actions in a battle of an online game application.

In the embodiments of this application, the out-of-game preview system provides an external interface. When an in-game action is previewed in the out-of-game environment interface, namely, when a trigger operation for a preview control corresponding to one in-game action is received, the out-of-game preview system invokes a target configuration file in the in-game system through the external interface, and parses the target configuration file to generate out-of-game model preview information. The UI system may invoke the out-of-game model preview information through the external interface, and display, according to the out-of-game model preview information, a process in which a character model performs the corresponding in-game action in the out-of-game environment interface. In this way, the in-game action of the character model is previewed in the out-of-game environment interface through interaction between the in-game system, the out-of-game preview system, and the UI system.

An in-game running environment and an out-of-game running environment of a game are different, the target configuration file is an in-game configuration file, and some in-game environment information included in the configuration file does not need to be reflected. Therefore, in a possible implementation, when the terminal obtains the target configuration file, the terminal needs to process the target configuration file, obtain a target event and a target event parameter corresponding to the target event in the target configuration file, and further generates the out-of-game model preview information according to the target event parameter corresponding to the target event.

Figure 6:
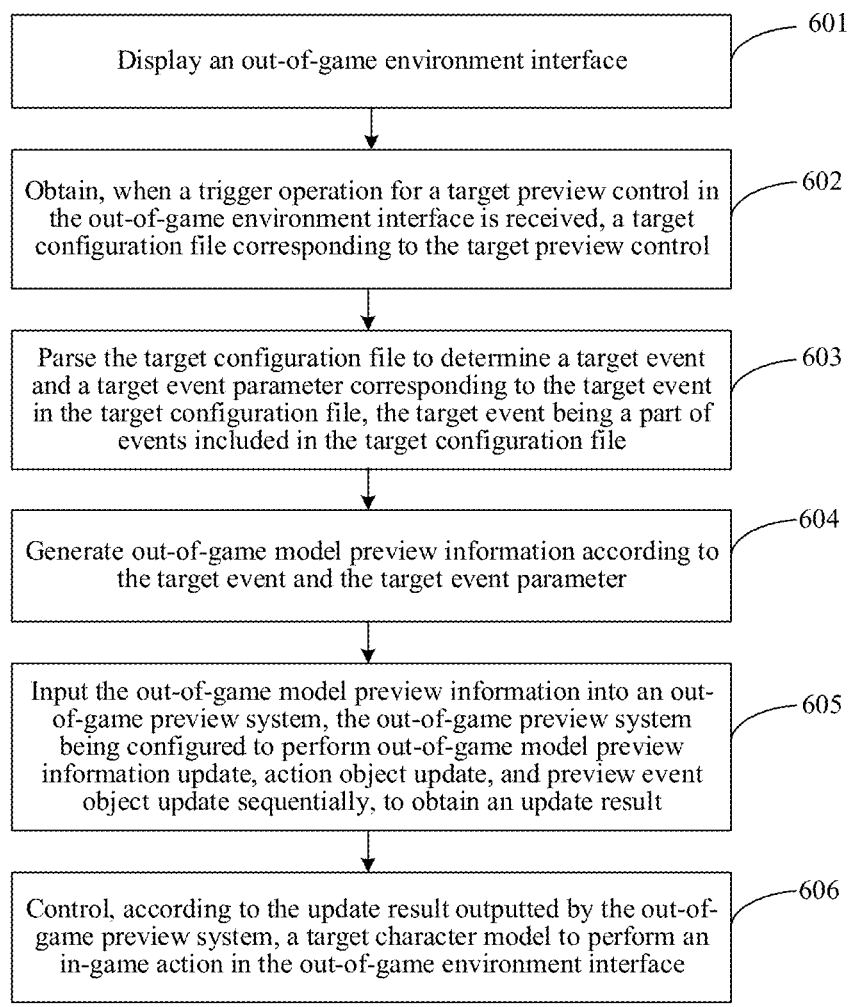
FIG. 6 is a flowchart of a method for previewing an in-game action in an out-of-game environment according to another exemplary embodiment of this application.

FIG. 6 is a flowchart of a method for previewing an in-game action in an out-of-game environment according to another exemplary embodiment of this application. The method includes:

Step 601: Display an out-of-game environment interface.

Step 602: Obtain, when a trigger operation for a target preview control in the out-of-game environment interface is received, a target configuration file corresponding to the target preview control, the target configuration file being used for controlling the target character model to perform a corresponding in-game action in the game.

For the implementation of step 601 and step 602, reference may be made to step 201 and step 202, and details are not described again in this embodiment.

Step 603: Parse the target configuration file to determine a target event and a target event parameter corresponding to the target event in the target configuration file, the target event being a part of events included in the target configuration file.

The target configuration file includes a plurality of events corresponding to an in-game action. That is, by parsing the target configuration file in an in-game environment, an action object that is used for controlling a target character model to perform an in-game action indicated by the target configuration file in a battle of an online game application may be generated. For example, if the target configuration file is a plurality of events corresponding to a "dancing" action of a character model A in a battle of an online game application, the target configuration file is parsed in the in-game environment, an action object that is used for controlling the character model A to "dance" in the game may be generated, and the character model A may be controlled to complete the "dancing" action in the game by running the action object.

In some embodiments, the same configuration file may include a plurality of events corresponding to a single in-game action. Since a character model includes a plurality of in-game actions in a battle of an online game application, the character model includes a plurality of corresponding configuration files.

The target configuration file includes a plurality of events corresponding to an in-game action, but when the in-game action is previewed in an out-of-game environment, not all events in the target configuration file need to be performed during out-of-game previewing. Therefore, in a possible implementation, the target configuration file needs to be parsed to determine a target event that is required during out-of-game previewing from the plurality of events included in the target configuration file, and a target event parameter corresponding to the target event needs to be determined, so as to control the character model to perform the in-game action in the out-of-game environment interface according to the target event and the target event parameter.

For example, if the in-game action corresponding to the target preview control is "dancing", events included in a configuration file corresponding to the in-game action may include: an action state, play animation, play sound, a background special effect, stop a current action, and the like. When the in-game action is previewed out of a battle of an online game application, the background special effect does not need to be displayed. Therefore, when the target configuration file is parsed, only the target events of an action state, playing animation, playing sound, and stopping a current action and event parameters corresponding to the target events need to be determined from the events included in the target configuration file.

The target event parameter corresponding to the target event refers to some indicating attributes completing the target event. Taking the in-game action "dancing" as an example, some target event parameters of the target event of playing animation are shown in Table 2.

TABLE 2

| | Event |
|---|---|
| Event type | PlayAnimDuration//Play Animation |
| Time | 0.000 |
| Length | 12.7 s |
| In-track index | 0 |
| Unique ID//Unique Identifier | |
| Unique identifier PlayAnimDuration | Ae42e09d-d72e-4ab3 |
| Operation object | Self//Self |
| Name | Dance//Dance |
| Animation Layer//Layer | 0 |
| Whether to loop | ✓ |

As can be learned from Table 2, a name of the target event of playing animation is Dance, and a duration of the playing animation is 12.7 s, and an operation object of the playing animation is Self.

In a possible implementation, after the target configuration file is obtained, the terminal parses the target configuration file to obtain event information (Event Info) and other information (Other Info) required for previewing the in-game action in the out-of-game environment, where the Event Info is the target event and the target event parameter corresponding to the target event, and the Other Info may include a file path of the target configuration file.

The target configuration file cannot be directly parsed, so that the target configuration file needs to be converted into a target configuration document executable by a program, so as to parse the target configuration document.

Figure 7:
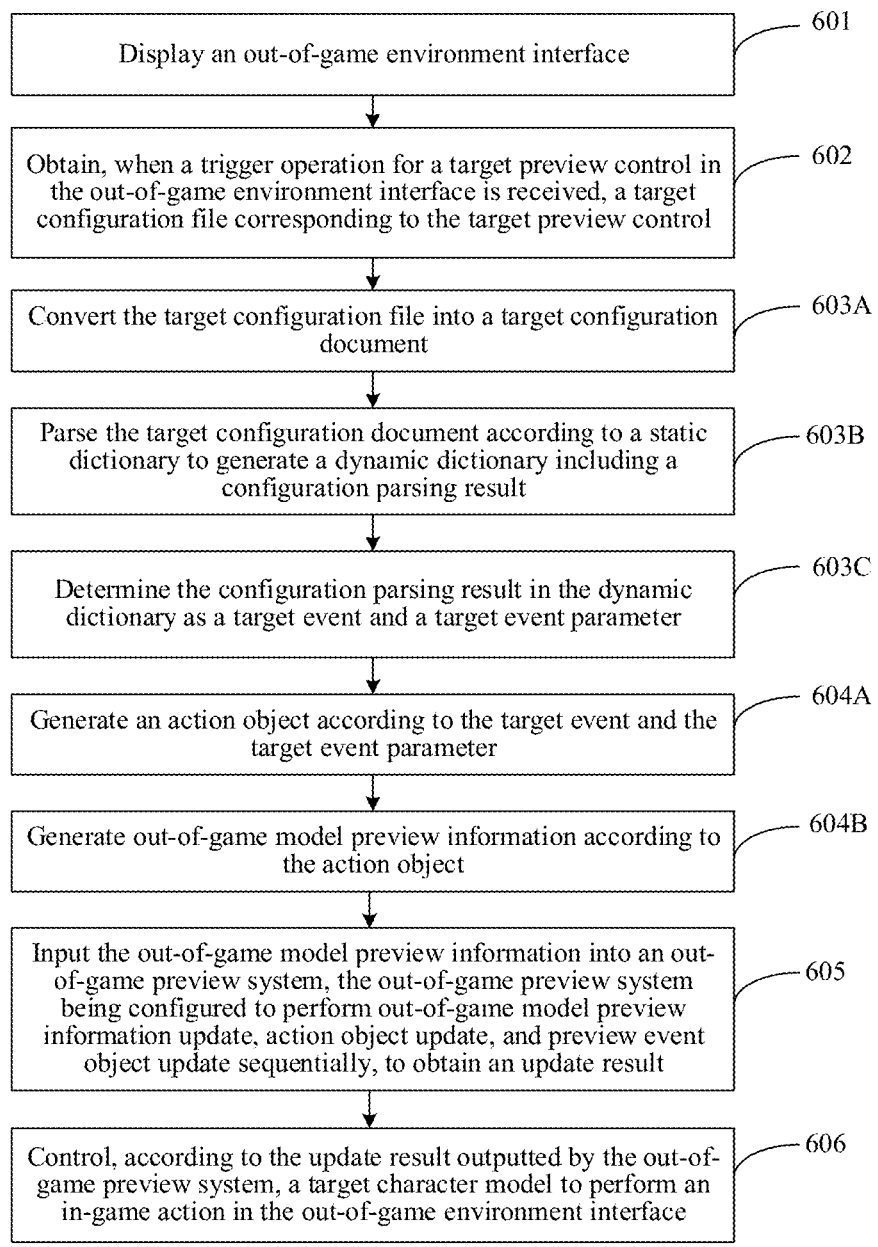
FIG. 7 is a flowchart of a method for previewing an in-game action in an out-of-game environment according to another exemplary embodiment of this application.

In a possible implementation, based on FIG. 6, as shown in FIG. 7, step 603 further includes step 603A to step 603C.

Step 603A: Convert the target configuration file into a target configuration document.

A format of the target configuration document may be an eXtensible markup language document (XmlDoc) or may be another document format that may be directly executed by a program, and the format of the target configuration document is not limited in this embodiment.

In a possible implementation, after the target configuration file is obtained, the terminal converts the target configuration file into a target configuration document, where the target configuration document includes a correspondence between a target event parameter name and a target event parameter value. For example, the target configuration document includes "target Id" and "1", where "target Id" is a target event parameter name, and "1" is a corresponding target event parameter value.

Step 603B: Parse the target configuration document according to a static dictionary to generate a dynamic dictionary including a configuration parsing result.

The static dictionary includes a correspondence between an event parameter category and an event parameter name, and the static dictionary includes a correspondence between all event parameter categories and event parameter names required for out-of-game previewing. The event parameter category is a category of an event parameter corresponding to the target event. That is, a name of one event parameter is represented by using a specific identifier.

For example, the event parameter name "target Id" is represented by using "Spawn Object Duration.Event Param.Target ID". That is, "Spawn Object Duration.Event Param.Target ID" is used as a key, and "target Id" is used as a value.

The dynamic dictionary is configured to store a correspondence between an event parameter category and an event parameter value, where an event corresponding to the event parameter category is an event required when an in-game action is previewed out of a battle of an online game application, and the event is a part of events selected from the configuration document according to the static dictionary.

In a possible implementation, when the target configuration document is parsed, a dynamic dictionary may be created according to a configuration parsing result. The configuration parsing result is a correspondence between an event parameter category and an event parameter value. That is, the dynamic dictionary includes a correspondence between an event parameter category and an event parameter value. For example, the event parameter category "Spawn Object Duration. Event Param.Target ID" is used as a key, the event parameter value "1" in the configuration parsing result is used as a value, and the key and the value are stored in the dynamic dictionary.

In a possible implementation, the static dictionary is pre-stored in the terminal, and when a configuration document needs to be parsed, the static dictionary may be directly invoked.

In some embodiments, a developer may add or delete the correspondence between an event parameter category and an event parameter name included in the static dictionary according to an actual out-of-game preview requirement.

In a possible implementation, the process of parsing the target configuration document according to a static dictionary may include the following steps:

1. Determining, when a candidate event parameter in the target configuration document matches the event parameter name in the static dictionary, a parameter value corresponding to the candidate event parameter as the event parameter value.

In a possible implementation, when the terminal obtains the target configuration document and parses the target configuration document according to the static dictionary, the target configuration document includes a correspondence between a plurality of event parameter names and event parameter values, and therefore, when it is parsed that a candidate event parameter name in the target configuration document matches the event parameter name in the static dictionary, it indicates that a candidate event corresponding to the candidate event parameter name is an event required for out-of-game previewing, and a parameter value corresponding to the candidate event parameter name needs to be obtained for subsequently generating out-of-game model preview information. Therefore, the parameter value corresponding to the candidate event parameter is determined as the event parameter value.

For example, when it is parsed that a candidate event parameter name "target Id" in the target configuration document matches the event parameter name "target Id" in the static dictionary, a parameter value "1" corresponding to the candidate event parameter name "target Id" is used as the event parameter value.

2. Using the event parameter category corresponding to the event parameter name as a key, using the event parameter value as a value, and storing the key and the value into the dynamic dictionary in an associated manner.

In a possible implementation, after the event parameter value is determined, the event parameter category corresponding to the event parameter name is used as a key of the dynamic dictionary, the event parameter value is used as a value of the dynamic dictionary, and the key and the value are stored in the dynamic dictionary in an associated manner.

For example, when it is parsed that the event parameter value corresponding to the event parameter name "target Id" is "1", the event parameter category "Spawn Object Duration.Event Param.Target ID" corresponding to the event parameter name is used as a key, the event parameter value "1" is used as a value, and the key and the value are stored in the dynamic dictionary in an associated manner.

Step 603C: Determine the configuration parsing result in the dynamic dictionary as the target event and the target event parameter.

In a possible implementation, when the terminal parses the target configuration document according to the static dictionary to generate a dynamic dictionary including a configuration parsing result, the configuration parsing result is further determined as the target event and the target event parameter. That is, the key in the dynamic dictionary is the target event, and the value corresponding to the key is the target event parameter.

Step 604: Generate out-of-game model preview information according to the target event and the target event parameter.

In a possible implementation, when the target event and the target event parameter are obtained, the terminal may generate out-of-game model preview information according to the target event and the target event parameter. The out-of-game model preview information may include an action object, a model background object, a model identifier, and the like.

In some embodiments, in-game actions are displayed in chronological order, but there is no chronological order of the obtained target event and the target event parameter in the dynamic dictionary, so that an action object needs to be formed by using the obtained target event and the target event parameter in chronological order, and the action object is used for indicating a target character to perform the in-game action.

In a possible implementation, based on FIG. 6, as shown in FIG. 7, step 604 may further include step 604A and step 604B.

Step 604A: Generate an action object according to the target event and the target event parameter.

The action object is used for indicating the target character model to perform the in-game action, the action object includes at least one preview event object, and each preview event object is used for indicating events of the same category included in the in-game action. For example, for the in-game action "dancing", the action object includes a plurality of preview event objects such as an action state, play animation, play sound, and stop a current action, and the preview event object of playing animation may include a plurality of events, such as playing a left-hand animation of a character model and playing a right-hand animation of the character model. The preview event objects are arranged in chronological order, and events included in each preview event object are also arranged in chronological order.

An in-game running environment and an out-of-game running environment are different, and manners in which the target configuration file are parsed are also different. Therefore, when an out-of-game action object is generated, a solution of the action object needs to be redesigned. That is, an action object generated out of a battle of an online game application is different from an action object generated in a battle of the online game application.

In a possible implementation, an in-game action object generated according to the target configuration file includes a three-layer structure, which is an Action-Track-Event structure. The action represents an in-game action, the track includes a category of events in the in-game action, and an event included in each track may be a tick event or may be a duration event.

Figure 8:
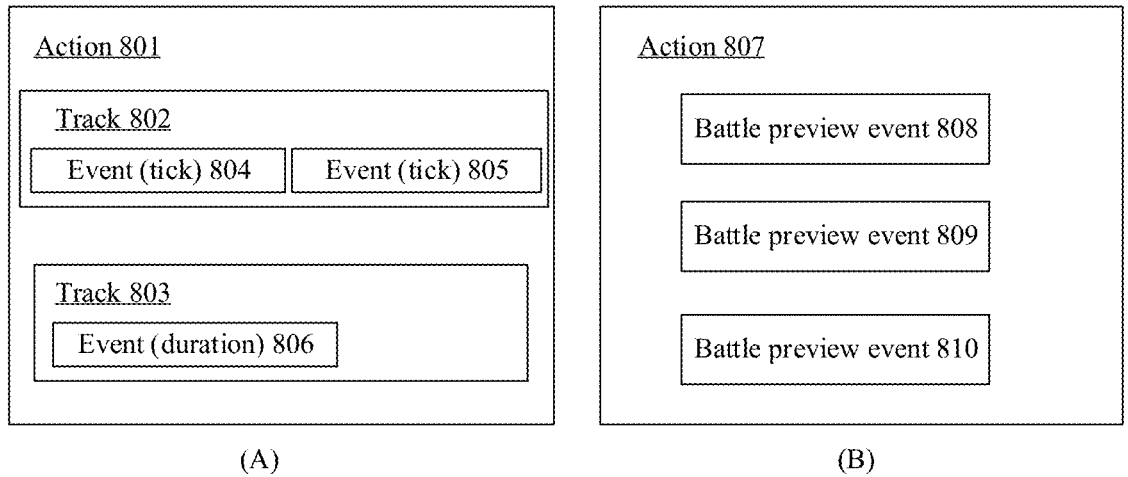
FIG. 8 is a schematic diagram of an in-game action object and an out-of-game action object according to an exemplary embodiment.

For example, as shown in (A) in FIG. 8, an Action 801 includes a Track 802 and a Track 803, the Track 802 further includes an Event (Tick) 804 and an Event (Tick) 805, and the Track 803 includes an Event (Duration) 806, which are entirely represented in an Action-Track-Event three-layer structure.

Oppositely, an out-of-game action object generated according to the same target configuration file includes a two-layer structure, which is an Action-Battle Preview Item structure. The Battle Preview Item in the out-of-game action object corresponds to the Event in the in-game action object.

For example, as shown in (B) in FIG. 8, an Action 807 includes a Battle Preview Item 808, a Battle Preview Item 809, and a Battle Preview Item 810, which are entirely represented in an Action-Battle Preview Item two-layer structure.

Apparently, the limitation of track is removed in the generated out-of-game action object relative to the in-game action object, so that the battle preview events are all independently arranged in the out-of-game action object in chronological order.

Step 604B: Generate the out-of-game model preview information according to the action object.

In a possible implementation, the terminal generates the out-of-game model preview information (information directly required by an out-of-game preview system) according to the obtained action object. The out-of-game model preview information not only includes the action object, but may also include a background information object of the character model and a master-slave attribute identifier of the character model.

Step 605: Input the out-of-game model preview information into an out-of-game preview system, the out-of-game preview system being configured to perform out-of-game model preview information update, action object update, and preview event object update sequentially, to obtain an update result.

In a possible implementation, after the out-of-game model preview information is obtained, the out-of-game model preview information is inputted into the out-of-game preview system, and update is performed in the out-of-game preview system according to a sequence of out-of-game model preview information update, action object update, and preview event object update.

The process of obtaining the out-of-game model preview information and the process of updating the out-of-game model preview information are both performed in the out-of-game preview system.

Step 606: Control, according to the update result outputted by the out-of-game preview system, the target character model to perform the in-game action in the out-of-game environment interface.

In a possible implementation, in a process that the out-of-game model preview information is run in a program, the out-of-game model preview information, the action object, and the preview event object are updated sequentially by the out-of-game preview system, and the character model are controlled, according to the update result, to perform the in-game action in the out-of-game environment interface sequentially in chronological order.

Figure 9:
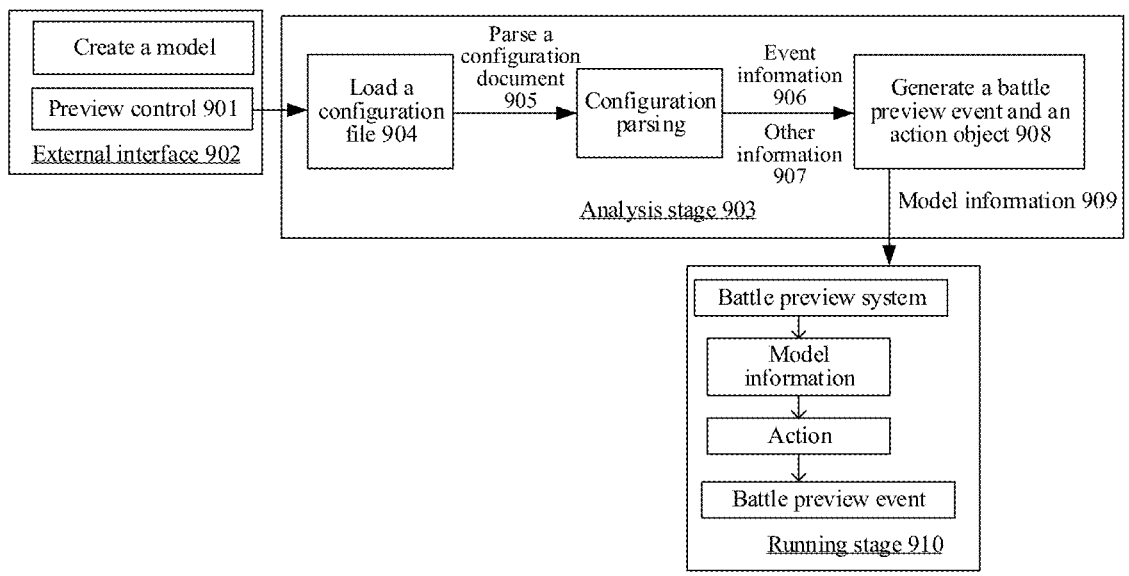
FIG. 9 is a schematic diagram of an implementation of a method for previewing an in-game action in an out-of-game environment according to another exemplary embodiment of this application.

For example, FIG. 9 shows a complete schematic diagram of previewing an in-game action in an out-of-game environment. A model is first created in an out-of-game environment interface, after a trigger operation for a preview control 901 is received, a terminal loads a configuration file 904 through an external interface 902. In an analysis stage 903, the loaded configuration file 904 is first converted into a configuration document 905, configuration parsing is performed on the configuration document 905 to obtain Event Info 906 and Other Info 907 required for out-of-game previewing, a Battle Preview Item and an Action object 908 are the generated according to the Event Info 906 and the Other Info 907, so as to generate Model Info 909, and the Model Info 909 is finally inputted into the out-of-game preview system. In a running stage 910, layer-by-layer update is performed according to a sequence of Battle Preview System, Model Info, Action, and Battle Preview Item, and the character model is controlled, according to an update result, to perform a corresponding in-game action in the out-of-game environment interface.

In this embodiment, the target configuration file is converted into a target configuration document executable by a program, the target configuration document is parsed by using a pre-stored static dictionary, a dynamic dictionary is further generated according to a configuration parsing result, to determine a target event and a target event parameter required for out-of-game previewing, which helps obtain the target event accurately. In addition, an action object different from an in-game action object is generated according to the target event and the target event parameter, out-of-game model preview information is further generated according to the action object, and the out-of-game model preview information is inputted into an out-of-game preview system for updating, so as to control, according to an outputted update result, the character model to perform the in-game action in the out-of-game environment interface. An in-game action of a character model is previewed in an out-of-game environment by reusing in-game configuration files and different parsing processes, so that types of in-game actions that can be previewed are enriched. In addition, there is no need to store videos corresponding to the in-game actions, thereby preventing in-game action videos from occupying storage space of a terminal.

An implementation process of out-of-game previewing is described in the foregoing example. If there is a new out-of-game preview requirement, corresponding configuration information may be added based on the existing out-of-game preview requirement implementation process, to meet the new preview requirement.

Figure 10:
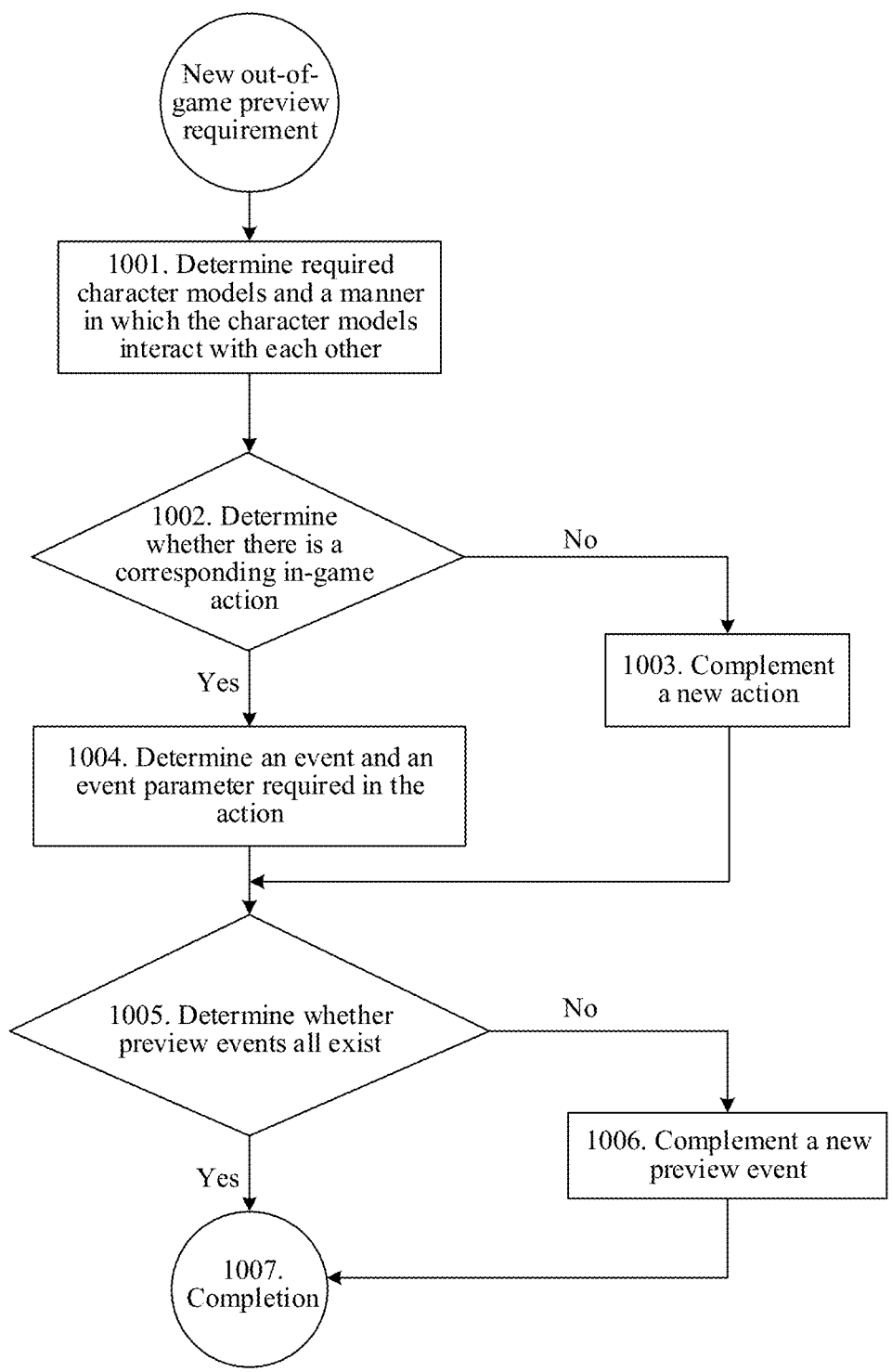
FIG. 10 is a flowchart of a process of meeting a new out-of-game preview requirement according to an exemplary embodiment of this application.

In a possible implementation, as shown in FIG. 10, a process of meeting the new out-of-game preview requirement may include the following steps:

Step 1001: Determine required character models and a manner in which the character models interact with each other.

When a new out-of-game preview requirement needs to be designed, a character model required by the out-of-game preview requirement is to be determined, and if a quantity of the required character models is greater than 1, a manner in which the character models interact with each other is further to be determined. When the foregoing step is completed, step 1002 is entered.

Step 1002: Determine whether there is an in-game action corresponding to the out-of-game preview requirement.

If the in-game action exists, step 1004 is entered; otherwise, step 1003 is entered.

Step 1003: Complement a new action.

When there is no in-game action corresponding to the out-of-game preview requirement, the developer needs to complement a new action. After the new action is complemented, step 1005 is entered.

Step 1004: Determine an event and an event parameter required in the action.

When there is an in-game action corresponding to the out-of-game preview requirement, an event and an event parameter required in the action during out-of-game previewing continue to be determined. When the foregoing step is completed, step 1005 is entered.

Step 1005: Determine whether preview events exist.

After an action object is generated according to the required event and the event parameter or new action information, whether the generated action object can instruct the character model to perform the action continues to be determined. That is, whether preview events in the action object all exist is determined. If the preview events all exist, step 1007 is entered. If there is a preview event lacked, step 1006 is entered.

Step 1006: Complement a new preview event.

When a preview event implementing the out-of-game preview requirement is lacked, the developer needs to complement a new preview event. After the new preview event is complemented, step 1007 is entered.

Step 1007: Completion.

The developer may complete the design of a new out-of-game preview requirement according to the foregoing procedure.

In a possible implementation, after the developer completes the design of a new out-of-game preview requirement according to the foregoing procedure, configuration update information may be pushed to the terminal in the form of an installation package, and the terminal may update the new out-of-game preview requirement according to the following steps.

1. Obtain Configuration Update Information.

The configuration update information includes at least one of action configuration update information and preview event configuration update information, the action configuration update information is configuration information corresponding to a newly added action, and the preview event configuration update information is configuration information corresponding to a newly added event.

In a possible implementation, after the developer completes the design of a new out-of-game preview requirement, the configuration update information may be pushed to the terminal in the form of an installation package, and the terminal obtains the configuration update information, namely, obtains configuration update information for an action or an event.

2. Store the Configuration Update Information and Update a Preview Control in the Out-of-Game Environment Interface.

In a possible implementation, when the configuration update information obtained by the terminal is action configuration update information, the action configuration update information may be stored in an in-game file or any storage region in an out-of-game file. When the obtained configuration update information is preview event configuration update information, the preview event configuration update information is to be stored in a storage region of an out-of-game file.

For example, after the developer completes the design of a new out-of-game preview requirement, a new preview control may be designed in the out-of-game environment interface correspondingly, for the user to tap the preview control to perform new out-of-game previewing. After the terminal receives an instruction of newly adding a preview control, the preview control in the out-of-game environment interface is updated.

When the user taps the newly added preview control, and the terminal receives a trigger operation for the preview control, a new action of the character model is previewed in the out-of-game environment according to the method for previewing an in-game action in an out-of-game environment provided in the foregoing embodiment.

In this embodiment, based on the existing out-of-game preview system, after the terminal obtains the configuration update information, the configuration update information is stored, and the preview control in the out-of-game environment interface is updated, so as to meet a new out-of-game preview requirement, thereby providing richer game preview and experience functions.

Figure 11:
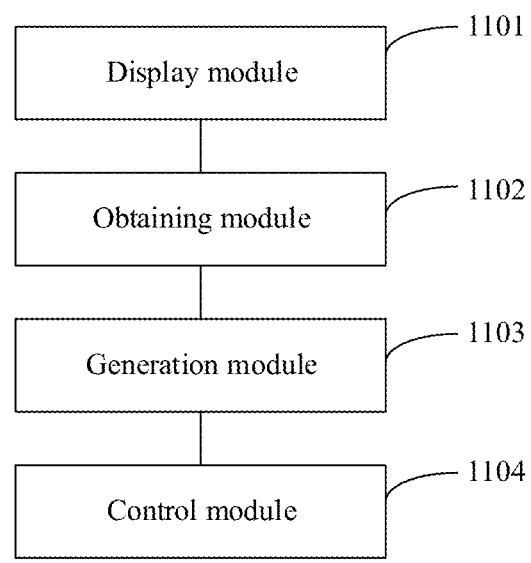
FIG. 11 is a structural block diagram of an apparatus for previewing an in-game action in an out-of-game environment according to an exemplary embodiment of this application.

FIG. 11 is a structural block diagram of an apparatus for previewing an in-game action in an out-of-game environment according to an exemplary embodiment of this application. The apparatus includes:

a display module 1101, configured to display an out-of-game environment interface, the out-of-game environment interface being an environment interface out of a game, and a target character model being displayed in the out-of-game environment interface;

a first obtaining module 1102, configured to obtain, when a trigger operation for a target preview control in the out-of-game environment interface is received, a target configuration file corresponding to the target preview control, the target configuration file being used for controlling the target character model to perform a corresponding in-game action in the game;

a generation module 1103, configured to generate out-of-game model preview information according to the target configuration file; and a control module 1104, configured to control, according to the out-of-game model preview information, the target character model to perform the in-game action in the out-of-game environment interface.

In some embodiments, the generation module 1103 includes:

a parsing unit, configured to parse the target configuration file to determine a target event and a target event parameter corresponding to the target event in the target configuration file, the target event being a part of events included in the target configuration file; and a generation unit, configured to generate the out-of-game model preview information according to the target event and the target event parameter.

In some embodiments, the parsing unit is further configured to:

convert the target configuration file into a target configuration document;

parse the target configuration document according to a static dictionary to generate a dynamic dictionary including a configuration parsing result, the static dictionary including a correspondence between an event parameter category and an event parameter name, the event parameter category being a category of an event parameter corresponding to the target event, and the configuration parsing result being a correspondence between the event parameter category and an event parameter value; and determine the configuration parsing result in the dynamic dictionary as the target event and the target event parameter.

In some embodiments, the target configuration document includes a correspondence between a parameter and a parameter value.

In some embodiments, the parsing unit is further configured to:

determine, when a candidate event parameter in the target configuration document matches the event parameter name in the static dictionary, a parameter value corresponding to the candidate event parameter as the event parameter value; and use the event parameter category corresponding to the event parameter name as a key, use the event parameter value as a value, and store the key and the value into the dynamic dictionary in an associated manner.

In some embodiments, the generation unit is further configured to:

generate an action object according to the target event and the target event parameter, the action object being used for indicating the in-game action performed by the target character model, the action object including at least one preview event object, and each preview event object being used for indicating events of the same category in the in-game action; and generate the out-of-game model preview information according to the action object.

In some embodiments, the control module includes:

an input unit, configured to input the out-of-game model preview information into an out-of-game preview system, the out-of-game preview system being configured to perform out-of-game model preview information update, action object update, and preview event object update sequentially, to obtain an update result; and a control unit, configured to control, according to the update result outputted by the out-of-game preview system, the target character model to perform the in-game action in the out-of-game environment interface.

In some embodiments, the apparatus further includes:

a second obtaining module, configured to obtain configuration update information, the configuration update information including at least one of action configuration update information and preview event configuration update information, the action configuration update information being configuration information corresponding to a newly added action, and the preview event configuration update information being configuration information corresponding to a newly added event; and an update module, configured to store the configuration update information and update a preview control in the out-of-game environment interface.

Based on the above, in the embodiments of this application, a target character model is displayed in an out-of-game environment interface, and when a trigger operation for a target preview control corresponding to the target character model is received, a target configuration file corresponding to the target preview control is obtained, so that out-of-game model preview information is generated according to the target configuration file, and the target character model is further controlled, according to the out-of-game model preview information, to perform an in-game action in the out-of-game environment interface. An in-game action of a character model is previewed in an out-of-game environment by reusing in-game configuration files, so that types of in-game actions that can be previewed are enriched. In addition, there is no need to store videos corresponding to the in-game actions, thereby preventing in-game action videos from occupying storage space of a terminal.

Figure 12:
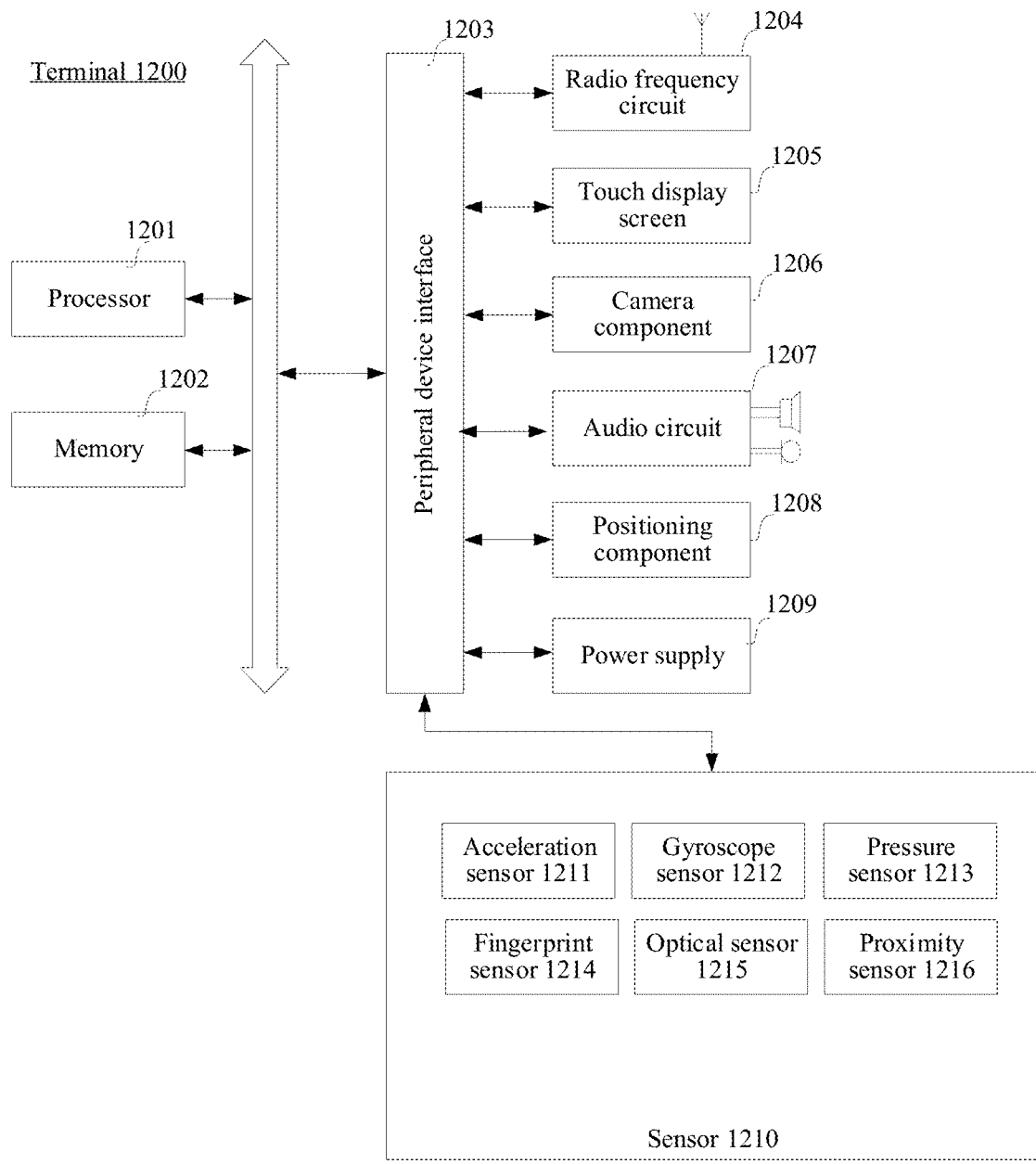
FIG. 12 is a structural block diagram of a terminal according to an exemplary embodiment of this application.

FIG. 12 is a structural block diagram of a terminal 1200 according to an exemplary embodiment of this application. The terminal 1200 may be a portable mobile terminal, for example, a smartphone, a tablet computer, a moving picture experts group audio layer III (MP3) player, or a moving picture experts group audio layer IV (MP4) player. The terminal 1200 may be further referred to as other names such as user equipment and a portable terminal.

Generally, the terminal 1200 includes a processor 1201 and a memory 1202.

The processor 1201 may include one or more processing cores, for example, a 4-core processor or an 8-core processor. The processor 1201 may be implemented by using at least one hardware form of a digital signal processor (DSP), a field-programmable gate array (FPGA), and a programmable logic array (PLA). The processor 1201 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1201 may be integrated with a graphics processing unit (GPU). The GPU is configured to render and draw content that needs to be displayed on a display screen. In some embodiments, the processor 1201 may further include an artificial intelligence (AI) processor. The AI processor is configured to process computing operations related to machine learning.

The memory 1202 may include one or more computer-readable storage media. The computer-readable storage medium may be tangible and non-transient. The memory 1202 may further include a high-speed random access memory and a nonvolatile memory, for example, one or more disk storage devices or flash storage devices. In some embodiments, the non-transitory computer-readable storage medium in the memory 1202 is configured to store at least one instruction, and the at least one instruction is configured to be executed by the processor 1201 to implement the method provided in the embodiments of this application.

In some embodiments, the terminal 1200 may further optionally include a peripheral device interface 1203 and at least one peripheral device. Specifically, the peripheral device includes: at least one of a radio frequency (RF) circuit 1204, a touch display screen 1205, a camera component 1206, an audio circuit 1207, a positioning component 1208, and a power supply 1209.

The peripheral device interface 1203 may be configured to connect the at least one peripheral device related to input/output (I/O) to the processor 1201 and the memory 1202. In some embodiments, the processor 1201, the memory 1202 and the peripheral device interface 1203 are integrated on a same chip or circuit board. In some other embodiments, any one or two of the processor 1201, the memory 1202, and the peripheral device interface 1203 may be implemented on a single chip or circuit board. This is not limited in this embodiment.

The RF circuit 1204 is configured to receive and transmit an RF signal, also referred to as an electromagnetic signal. The RF circuit 1204 communicates with a communication network and other communication devices through the electromagnetic signal. The RF circuit 1204 converts an electrical signal to an electromagnetic signal for transmission, or converts a received electromagnetic signal to an electrical signal. In some embodiments, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF circuit 1204 may further include a circuit related to NFC, which is not limited in this application.

The touch display screen 1205 is configured to display a user interface (UI). The UI may include a graph, text, an icon, a video, and any combination thereof. The touch display screen 1205 further includes a capability of acquiring a touch signal on or above a surface of the touch display screen 1205. The touch signal may be inputted to the processor 1201 as a control signal for processing. The touch display screen 1205 is configured to provide a virtual button and/or a virtual keyboard, also referred to as a soft button and/or a soft keyboard. In some embodiments, there may be one touch display screen 1205, disposed on a front panel of the terminal 1200. In some other embodiments, there may be at least two touch display screens 1205, disposed on different surfaces of the terminal 1200 respectively or in a folded design. In some more embodiments, the touch display screen 1205 may be a flexible display screen, disposed on a curved surface or a folded surface of the terminal 1200. Even, the touch display screen 1205 may be further set in a non-rectangular irregular pattern, namely, a special-shaped screen. The touch display screen 1205 may be made of a material such as a liquid crystal display (LCD) or an organic light-emitting diode (OLED).

The camera component 1206 is configured to capture images or videos. In some embodiments, the camera component 1206 includes a front-facing camera and a rear-facing camera. Generally, the front-facing camera is configured to implement a video call or self-portrait. The rear-facing camera is configured to capture a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and virtual reality (VR) shooting functions by fusing the main camera and the wide-angle camera. In some embodiments, the camera component 1206 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1207 is configured to provide an audio interface between a user and the terminal 1200. The audio circuit 1207 may include a microphone and a speaker. The microphone is configured to acquire sound waves of a user and an environment, and convert the sound waves into an electrical signal to input to the processor 1201 for processing, or input to the radio frequency circuit 1204 for implementing voice communication. For stereo acquisition or noise reduction, there may be a plurality of microphones that are respectively disposed at different portions of the terminal 1200. The microphone may further be an array microphone or an omni-directional acquisition type microphone. The speaker is configured to convert electrical signals from the processor 1201 or the RF circuit 1204 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1207 may further include an earphone jack.

The positioning component 1208 is configured to determine a current geographic location of the terminal 1200, to implement a navigation or a location based service (LBS). The positioning component 1208 may be a positioning component based on the Global Positioning System (GPS) of the United States, the BeiDou System of China, and the GLONASS System of Russia.

The power supply 1209 is configured to supply power to components in the terminal 1200. The power supply 1209 may be an alternating current, a direct current, a disposable battery, or a rechargeable battery. When the power supply 1209 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1200 may further include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 may detect a magnitude of acceleration on three coordinate axes of a coordinate system established by the terminal 1200. For example, the acceleration sensor 1211 may be configured to detect components of gravity acceleration on the three coordinate axes. The processor 1201 may control, according to a gravity acceleration signal acquired by the acceleration sensor 1211, the touch display screen 1205 to display the UI in a frame view or a portrait view. The acceleration sensor 1211 may be further configured to acquire motion data of a game or a user.

The gyroscope sensor 1212 may detect a body direction and a rotation angle of the terminal 1200. The gyroscope sensor 1212 may cooperate with the acceleration sensor 1211 to acquire a 3D action by the user on the terminal 1200. The processor 1201 may implement the following functions according to data acquired by the gyroscope sensor 1212: motion sensing (for example, the UI is changed according to a tilt operation of a user), image stabilization during shooting, game control, and inertial navigation.

The pressure sensor 1213 may be disposed on a side frame of the terminal 1200 and/or a lower layer of the touch display screen 1205. When the pressure sensor 1213 is disposed at the side frame of the terminal 1200, a holding signal of the user on the terminal 1200 may be detected, and left/right hand identification and a quick action may be performed according to the holding signal. When the pressure sensor 1213 is disposed at the lower layer of the touch display screen 1205, an operable control on the UI interface can be controlled according to a pressure operation of the user on the touch display screen 1205. The operable control includes at least one of a button control, a scroll-bar control, an icon control, and a menu control.

The fingerprint sensor 1214 is configured to acquire a user's fingerprint to identify a user's identity according to the acquired fingerprint. When identifying that the user's identity is a trusted identity, the processor 1201 authorizes the user to perform related sensitive operations. The sensitive operations include: unlocking a screen, viewing encrypted information, downloading software, paying, changing a setting, and the like. The fingerprint sensor 1214 may be disposed on a front surface, a back surface, or a side surface of the terminal 1200. When a physical button or a vendor logo is disposed on the terminal 1200, the fingerprint sensor 1214 may be integrated with the physical button or the vendor logo.

The optical sensor 1215 is configured to acquire ambient light intensity. In an embodiment, the processor 1201 may control the display brightness of the touch display screen 1205 according to the ambient light intensity acquired by the optical sensor 1215. Specifically, when the ambient light intensity is relatively high, the display brightness of the touch display screen 1205 is increased. When the ambient light intensity is relatively low, the display brightness of the touch display screen 1205 is decreased. In another embodiment, the processor 1201 may further dynamically adjust a camera parameter of the camera component 1206 according to the ambient light intensity acquired by the optical sensor 1215.

The proximity sensor 1216, also referred to as a distance sensor, is generally disposed on the front surface of the terminal 1200. The proximity sensor 1216 is configured to acquire a distance between the user and the front surface of the terminal 1200. In an embodiment, when the proximity sensor 1216 detects that the distance between the user and the front surface of the terminal 1200 gradually becomes smaller, the touch display screen 1205 is controlled by the processor 1201 to switch from a screen-on state to a screen-off state. In a case that the proximity sensor 1216 detects that the distance between the user and the front surface of the terminal 1200 gradually becomes larger, the touch display screen 1205 is controlled by the processor 1201 to switch from the screen-off state to the screen-on state.

A person skilled in the art may understand that a structure shown in FIG. 12 constitutes no limitation on the terminal 1200, and the terminal may include more or fewer components than those shown in the figure, or some components may be combined, or a different component deployment may be used.

An embodiment of this application further provides a computer-readable medium, storing at least one instruction, the at least one instruction being loaded and executed by a processor to implement the method for previewing an in-game action in an out-of-game environment according to the foregoing embodiments.

An embodiment of this application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the method for previewing an in-game action in an out-of-game environment provided in the foregoing optional implementations according to the foregoing aspect.

A person skilled in the art is to be aware that in the one or more examples, the functions described in the embodiments of this application may be implemented by using hardware, software, firmware, or any combination thereof. When implemented by using software, the functions can be stored in a computer-readable medium or can be used as one or more instructions or code in a computer-readable medium for transferring. The computer-readable medium includes a computer storage medium and a communication medium, where the communication medium includes any medium that enables a computer program to be transmitted from one place to another. The storage medium may be any available medium accessible to a general-purpose or dedicated computer.

The foregoing descriptions are merely embodiments of this application, but are not intended to limit this application. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. Any modification, equivalent replacement, or improvement made within the spirit and principle of this application shall fall within the protection scope of this application.

What is claimed is:

1. A method for previewing an in-game action in an out-of-game environment of an online game application performed by a computer device, the method comprising:
    displaying an out-of-game environment interface, the out-of-game environment interface being an environment interface out of a battle of the online game application, and a target character model and a target preview control being displayed in the out-of-game environment interface;
    obtaining, when a trigger operation for the target preview control in the out-of-game environment interface is received, a target configuration file corresponding to the target preview control, the target configuration file being used for controlling the target character model to perform a corresponding in-game action in the battle of the online game application;
    parsing the target configuration file according to a static dictionary to determine a plurality of target events and a plurality of target event parameters corresponding to the plurality of target events in the target configuration file, the static dictionary comprising a correspondence between an event parameter category and an event parameter name, the event parameter category being a category of an event parameter corresponding to the target event;
    generating out-of-game model preview information according to the plurality of target events and the corresponding plurality of target event parameters parsed from the target configuration file; and
    controlling, according to the out-of-game model preview information, the target character model to perform the in-game action in the out-of-game environment interface.

2. The method according to claim 1, wherein the parsing the target configuration file to determine a plurality of target events and a plurality of target event parameters corresponding to the plurality of target events in the target configuration file comprises:
    converting the target configuration file into a target configuration document;
    for each of the plurality of target events:
    parsing the target configuration document according to a static dictionary to generate a dynamic dictionary comprising a configuration parsing result corresponding to the target event, the static dictionary comprising a correspondence between an event parameter category and an event parameter name, the event parameter category being a category of an event parameter corresponding to the target event, and the configuration parsing result being a correspondence between the event parameter category and an event parameter value; and
    determining the configuration parsing result in the dynamic dictionary as the target event and the target event parameter.

3. The method according to claim 2, wherein the target configuration document comprises a correspondence between a parameter and a parameter value; and
    the parsing the target configuration document according to a static dictionary to generate a dynamic dictionary comprising a configuration parsing result comprises:
    determining, when a candidate event parameter in the target configuration document matches the event parameter name in the static dictionary, a parameter value corresponding to the candidate event parameter as the event parameter value; and
    using the event parameter category corresponding to the event parameter name as a key, using the event parameter value as a value, and storing the key and the value into the dynamic dictionary in an associated manner.

4. The method according to claim 1, wherein the generating the out-of-game model preview information according to the plurality of target events and the corresponding plurality of target event parameters parsed from the target configuration file comprises:
    generating an action object according to the plurality of target events and the corresponding plurality of target event parameters, the action object being used for indicating the in-game action performed by the target character model, the action object comprising at least one preview event object, and each preview event object being used for indicating events of the same category in the in-game action; and
    generating the out-of-game model preview information according to the action object.

5. The method according to claim 4, wherein the controlling, according to the out-of-game model preview information, the target character model to perform the in-game action in the out-of-game environment interface comprises:

inputting the out-of-game model preview information into an out-of-game preview system, the out-of-game preview system being configured to perform an out-of-game model preview information update, an action object update, and a preview event object update sequentially, to obtain an update result; and controlling, according to the update result outputted by the out-of-game preview system, the target character model to perform the in-game action in the out-of-game environment interface.

6. The method according to claim 1, further comprising:

obtaining configuration update information, the configuration update information comprising at least one of action configuration update information and preview event configuration update information, the action configuration update information being configuration information corresponding to a newly added action, and the preview event configuration update information being configuration information corresponding to a newly added event; and storing the configuration update information and updating a preview control in the out-of-game environment interface.

7. A computer device, comprising a processor and a memory, the memory storing at least one instruction, and the at least one instruction being executed by the processor to perform a plurality of operations including:

displaying an out-of-game environment interface, the out-of-game environment interface being an environment interface out of a battle of the online game application, and a target character model and a target preview control being displayed in the out-of-game environment interface;

obtaining, when a trigger operation for the target preview control in the out-of-game environment interface is received, a target configuration file corresponding to the target preview control, the target configuration file being used for controlling the target character model to perform a corresponding in-game action in the battle of the online game application;

parsing the target configuration file according to a static dictionary to determine a plurality of target events and a plurality of target event parameters corresponding to the plurality of target events in the target configuration file, the static dictionary comprising a correspondence between an event parameter category and an event parameter name, the event parameter category being a category of an event parameter corresponding to the target event;

generating out-of-game model preview information according to the plurality of target events and the corresponding plurality of target event parameters parsed from the target configuration file; and controlling, according to the out-of-game model preview information, the target character model to perform the in-game action in the out-of-game environment interface.

8. The computer device according to claim 7, wherein the parsing the target configuration file to determine a plurality of target events and a plurality of target event parameters corresponding to the plurality of target events in the target configuration file comprises:

converting the target configuration file into a target configuration document;

for each of the plurality of target events:

parsing the target configuration document according to a static dictionary to generate a dynamic dictionary comprising a configuration parsing result corresponding to the target event, the static dictionary comprising a correspondence between an event parameter category and an event parameter name, the event parameter category being a category of an event parameter corresponding to the target event, and the configuration parsing result being a correspondence between the event parameter category and an event parameter value; and determining the configuration parsing result in the dynamic dictionary as the target event and the target event parameter.

9. The computer device according to claim 8, wherein the target configuration document comprises a correspondence between a parameter and a parameter value; and the parsing the target configuration document according to a static dictionary to generate a dynamic dictionary comprising a configuration parsing result comprises:

determining, when a candidate event parameter in the target configuration document matches the event parameter name in the static dictionary, a parameter value corresponding to the candidate event parameter as the event parameter value; and using the event parameter category corresponding to the event parameter name as a key, using the event parameter value as a value, and storing the key and the value into the dynamic dictionary in an associated manner.

10. The computer device according to claim 7, wherein the generating the out-of-game model preview information according to the plurality of target events and the corresponding plurality of target event parameters parsed from the target configuration file comprises:

generating an action object according to the plurality of target events and the corresponding plurality of target event parameters, the action object being used for indicating the in-game action performed by the target character model, the action object comprising at least one preview event object, and each preview event object being used for indicating events of the same category in the in-game action; and generating the out-of-game model preview information according to the action object.

11. The computer device according to claim 10, wherein the controlling, according to the out-of-game model preview information, the target character model to perform the in-game action in the out-of-game environment interface comprises:

inputting the out-of-game model preview information into an out-of-game preview system, the out-of-game preview system being configured to perform an out-of-game model preview information update, an action object update, and a preview event object update sequentially, to obtain an update result; and controlling, according to the update result outputted by the out-of-game preview system, the target character model to perform the in-game action in the out-of-game environment interface.

12. The computer device according to claim 7, wherein the plurality of operations further comprise:

obtaining configuration update information, the configuration update information comprising at least one of action configuration update information and preview event configuration update information, the action configuration update information being configuration information corresponding to a newly added action, and the preview event configuration update information being configuration information corresponding to a newly added event; and storing the configuration update information and updating a preview control in the out-of-game environment interface.

13. A non-transitory computer-readable storage medium, storing at least one instruction, the at least one instruction being executed by a processor of a computer device to perform a plurality of operations including:

displaying an out-of-game environment interface, the out-of-game environment interface being an environment interface out of a battle of the online game application, and a target character model and a target preview control being displayed in the out-of-game environment interface;

obtaining, when a trigger operation for the target preview control in the out-of-game environment interface is received, a target configuration file corresponding to the target preview control, the target configuration file being used for controlling the target character model to perform a corresponding in-game action in the battle of the online game application;

parsing the target configuration file according to a static dictionary to determine a plurality of target events and a plurality of target event parameters corresponding to the plurality of target events in the target configuration file, the static dictionary comprising a correspondence between an event parameter category and an event parameter name, the event parameter category being a category of an event parameter corresponding to the target event;

generating out-of-game model preview information according to the plurality of target events and the corresponding plurality of target event parameters parsed from the target configuration file; and controlling, according to the out-of-game model preview information, the target character model to perform the in-game action in the out-of-game environment interface.

14. The non-transitory computer-readable storage medium according to claim 13, wherein the parsing the target configuration file to determine a plurality of target events and a plurality of target event parameters corresponding to the plurality of target events in the target configuration file comprises:

converting the target configuration file into a target configuration document;

for each of the plurality of target events:

parsing the target configuration document according to a static dictionary to generate a dynamic dictionary comprising a configuration parsing result corresponding to the target event, the static dictionary comprising a correspondence between an event parameter category and an event parameter name, the event parameter category being a category of an event parameter corresponding to the target event, and the configuration parsing result being a correspondence between the event parameter category and an event parameter value; and determining the configuration parsing result in the dynamic dictionary as the target event and the target event parameter.

15. The non-transitory computer-readable storage medium according to claim 14, wherein the target configuration document comprises a correspondence between a parameter and a parameter value; and the parsing the target configuration document according to a static dictionary to generate a dynamic dictionary comprising a configuration parsing result comprises:

determining, when a candidate event parameter in the target configuration document matches the event parameter name in the static dictionary, a parameter value corresponding to the candidate event parameter as the event parameter value; and using the event parameter category corresponding to the event parameter name as a key, using the event parameter value as a value, and storing the key and the value into the dynamic dictionary in an associated manner.

16. The non-transitory computer-readable storage medium according to claim 13, wherein the generating the out-of-game model preview information according to the plurality of target events and the corresponding plurality of target event parameters parsed from the target configuration file comprises:

generating an action object according to the plurality of target events and the corresponding plurality of target event parameters, the action object being used for indicating the in-game action performed by the target character model, the action object comprising at least one preview event object, and each preview event object being used for indicating events of the same category in the in-game action; and generating the out-of-game model preview information according to the action object.

17. The non-transitory computer-readable storage medium according to claim 13, wherein the plurality of operations further comprise:

obtaining configuration update information, the configuration update information comprising at least one of action configuration update information and preview event configuration update information, the action configuration update information being configuration information corresponding to a newly added action, and the preview event configuration update information being configuration information corresponding to a newly added event; and storing the configuration update information and updating a preview control in the out-of-game environment interface.

* * * * *